US010591632B2

(12) United States Patent
Howell et al.

(10) Patent No.: US 10,591,632 B2
(45) Date of Patent: Mar. 17, 2020

(54) INTERFEROMETRIC PENDULUM GRAVIMETER, AND METHOD FOR SAME

(71) Applicant: UNIVERSITY OF ROCHESTER, Rochester, NY (US)

(72) Inventors: John C. Howell, Jerusalem (IL); Christopher Mullarkey, Beacon, NY (US); Julian Martinez-Rincon, Redwood City, CA (US)

(73) Assignee: UNIVERSITY OF ROCHESTER, Rochester, NY (US)

(*) Notice: Subject to any disclaimer, the term of this patent is extended or adjusted under 35 U.S.C. 154(b) by 210 days.

(21) Appl. No.: 15/759,673

(22) PCT Filed: Sep. 16, 2016

(86) PCT No.: PCT/US2016/052180
§ 371 (c)(1),
(2) Date: Mar. 13, 2018

(87) PCT Pub. No.: WO2017/049116
PCT Pub. Date: Mar. 23, 2017

(65) Prior Publication Data
US 2019/0041544 A1    Feb. 7, 2019

Related U.S. Application Data

(60) Provisional application No. 62/219,305, filed on Sep. 16, 2015.

(51) Int. Cl.
G01C 1/00    (2006.01)
G01V 7/12    (2006.01)
G01V 7/04    (2006.01)
(52) U.S. Cl.
CPC ............. G01V 7/12 (2013.01); G01C 1/00 (2013.01); G01V 7/04 (2013.01)

(58) Field of Classification Search
CPC ............. G01V 7/12; G01V 7/04; G01C 1/00
(Continued)

(56) References Cited

U.S. PATENT DOCUMENTS 9,939,551 B2*   4/2018  Levitt .................... G01V 7/00
2002/0152810 A1* 10/2002  Couture .................. G01V 7/04
                                                      73/382 R
2003/0136190 A1*  7/2003  Araya ..................... G01P 3/36
                                                      73/382 R

FOREIGN PATENT DOCUMENTS

WO    2017049116 A1    3/2017

OTHER PUBLICATIONS

Dransfield, Airborne Gravity Gradiometry in the Search for Mineral Deposits, Advances in Airborne Geophysics, Jan. 2007, 14 pages.
(Continued)

Primary Examiner — Jamel E Williams
(74) Attorney, Agent, or Firm — Kilpatrick Townsend & Stockton LLP

(57) ABSTRACT

Embodiments of the present invention may be generally related to methods, devices, and systems which measure a gravitational field. The methods and devices may utilize an interferometer to measure tilt of a pendulum, where the tilt of the pendulum is due to a gravitational force associated with a target object. In some embodiments, the interferometer may be a displaced, even parity, Sagnac interferometer. Additionally, the interferometer may be operated in the inverse weak value domain. In some embodiments, the pendulum and interferometric readout may measure relative gravitational fields that are transverse to Earth's gravitational field. In at least some embodiments, methods and devices may have shot noise limited sensitivity sufficient to detect one kilogram 25 meters away and may have a 1 nGal resolution after mere seconds of integration. Embodiments
(Continued)

disclosed may be used to gravitationally map density fluctuations in a target object, including the human body.

52 Claims, 2 Drawing Sheets

(58) Field of Classification Search
USPC .................................................. 73/382 R
See application file for complete search history.

(56) References Cited

OTHER PUBLICATIONS

Armstrong et al., "New Measurements of G Using the Measurement Standards Laboratory Torsion Balance", Physical Review Letter, vol. 91, Issue 20, Nov. 14, 2003, 4 pages.
Bagley et al., "Preliminary Results of a Determination of the Newtonian Constant of Gravitation: A Test of the Kuroda Hypothesis", Physical Review Letters, vol. 78, Issue 16, Apr. 21, 1997, pp. 3047-3050.
Bell et al., "The Rise and Fall of Early Oil Field Technology: The Torsion Balance Gradiometer", The Leading Edge, vol. 17, No. 1, Jan. 1998, pp. 81-83.
Cavendish, "Experiments to Determine the Density of the Earth", Phil. Trans. R. Soc. Lond, vol. 88, Jun. 21, 1798, pp. 469-526.
De Angelis et al., "Precision Gravimetry with Atomic Sensors", Measurement Science and Technology, vol. 20, No. 2, 2009, 16 pages.
Dimopoulos et al., "Testing General Relativity with Atom Interferometry", Physical Review Letter, vol. 98, Issue 11, Mar. 27, 2007, 4 pages.
ESA, "ESA's Gravity Mission GOCE", Available online at: http://www.esa.int/esaLP/LPgoce.html, Jun. 2006, 20 pages.
Dixon et al., "Ultrasensitive Beam Deflection Measurement via Interferometric Weak Value Amplification", Phys. Rev. Lett., vol. 102, No. 17, Apr. 27, 2009, 5 pages.
Goodkind, "The Superconducting Gravimeter", Review of Scientific Instruments, vol. 70, No. 11, Nov. 1999, pp. 4131-4152.
Gundlach et al., "Measurement of Newton's Constant Using a Torsion Balance with Angular Acceleration Feedback", Physical Review Letters, vol. 85, Issue 14, Oct. 2, 2000, pp. 2869-2872.
Jordan et al., "Technical Advantages for Weak-Value Amplification: When Less Is More", Physical Review X, vol. 4, No. 1, Mar. 6, 2014, pp. 011031-1-011031-11.
Karagioz et al., "Measurement of the Gravitational Constant With a Torsion Balance", Measurement Techniques, vol. 39, Issue 10, Oct. 1996, pp. 979-987.
Kleinevoss et al., "Absolute Measurement of the Newtonian Force and a Determination of G", Measurement Science and Technology, vol. 10, No. 6, Jun. 1999, pp. 492-494.
Knudsen et al., A global mean dynamic topography and ocean circulation estimation using a preliminary GOCE gravity model, J. Geod., vol. 85, 2011, pp. 861-879.
Kuroda, "Does the Time-of-Swing Method Give a Correct Value of the Newtonian Gravitational Constant?", Phys. Rev. Lett., vol. 75, Issue 15, Oct. 9, 1995, pp. 2796-2798.
Lamporesi et al., "Determination of the Newtonian Gravitational Constant Using Atom Interferometry", Physical Review Letter, vol. 100, Issue 5, Feb. 8, 2008, 4 pages.
Luo et al., "Determination of the Newtonian Gravitational Constant G with Time-of-Swing Method", Physical Review Letter, vol. 102, Issue 24, Jun. 16, 2009, 4 pages.
Luther et al., "Redetermination of the Newtonian Gravitational Constant G", Phys. Rev. Lett., vol. 48, Issue 3, Jan. 18, 1982, pp. 121-123.
McGuirk et al., "Sensitive Absolute Gravity Gradiometry Using Atom Interferometry", Physical Review Article, vol. 65, Issue 3, Feb. 2, 2002, 25 pages.
Parks et al., "Simple Pendulum Determination of the Gravitational Constant", Physical Review Letter, vol. 105, Issue 11, Sep. 7, 2010, pp. 1-10.
PCT/US2016/052180, "International Preliminary Report on Patentability", dated Mar. 29, 2018, 9 pages.
PCT/US2016/052180, "International Search Report and Written Opinion", dated Jan. 23, 2017, 13 pages.
Peters et al., "High-precision Gravity Measurements Using Atom Interferometry", Metrologia, vol. 38, No. 1, Oct. 1998, pp. 411-419.
Peters et al., "Measurement of Gravitational Acceleration by Dropping Atoms", Nature, vol. 400, Issue 6747, Aug. 26, 1999, pp. 849-852.
Quinn et al., "A New Determination of G Using Two Methods", Physical Review Letter, vol. 87, No. 11, Sep. 10, 2001, pp. 101102-1-101102-5.
Romaides et al., "A Comparison of Gravimetric Techniques for Measuring Subsurface Void Signals", Journal of Physics D: Applied Physics, vol. 34, No. 3, Feb. 2001, pp. 433-443.
Rosi et al., "Precision Measurement of the Newtonian Gravitational Constant Using Cold Atoms", Nature, vol. 510, Jun. 26, 2014, pp. 518-521.
Schlamminger et al., "Test of the Equivalence Principle Using a Rotating Torsion Balance", Phys.Rev.Lett., vol. 100, No. 4, Jan. 28, 2008, 4 pages.
Sorrentino et al., "Sensitive Gravity-Gradiometry with Atom Interferometry: Progress Towards an Improved Determination of the Gravitational Constant", New Journal of Physics, vol. 12, Sep. 24, 2010, 17 pages.
Starling et al., "Continuous Phase Amplification with a Sagnac Interferometer", Physical Review A, vol. 82, No. 1, Dec. 2009, 5 pages.
Starling, "Optimizing the Signal to Noise Ratio of a Beam Deflection Measurement with Interferometric Weak Values", Physical Review, vol. 80, Oct. 2009, 5 pages.
Van Leeuwen, "BHP Develops Airborne Gravity Gradiometer for Mineral Exploration", The Leading Edge, vol. 19, No. 12, Dec. 1, 2000, pp. 1296-1297.
Viza et al., "Experimentally Quantifying the Advantages of Weak-Values-Based Metrology", Lasers and Electro-Optics, Aug. 13, 2015, 11 pages.
Wahr et al., "Time-variable Gravity from GRACE: First Results", Geophysical Research Letters, vol. 31, No. 11, Jun. 9, 2004, 4 pages.

\* cited by examiner

INTERFEROMETRIC PENDULUM GRAVIMETER, AND METHOD FOR SAME

CROSS-REFERENCE TO RELATED APPLICATION

This application claims priority to U.S. Provisional Application No. 62/219,305, filed Sep. 16, 2015, which is incorporated herein by reference in its entirety.

STATEMENT REGARDING FEDERAL FUNDING

This invention was made with government support under W911NF-12-1-0263 and W911NF-15-1-0296 awarded by the Army Research Office. The government has certain rights in the invention.

BACKGROUND

Embodiments of the present invention generally relate to methods, devices, and systems for measuring tilt and more particularly measuring tilt of a pendulum for measuring gravitational fields transverse to the Earth's gravitational field.

Precision gravimetry is used extensively in mapping the Earth's local gravity and is important in oil and gas exploration, mining and mapping temporal geological shifts, the determination of Newton's gravitational constant and gravitationally imaging opaque systems. Precision of the order of 1 mGal (1 Gal=1 cm/s$^2$) to 1 µGal is needed for mapping geological variations. Both relative and absolute measurements are employed. A standard in the industry for absolute measurements is measuring interference fringes due to the free-fall of a corner cube in one arm of a Mach-Zehnder interferometer with a sensitivity of 100 µGal/Hz$^{-1/2}$. More recent measurements employ atomic interferometry achieving precisions of 100 nGal after two days of integration. The most sensitive device so far is a superconducting sphere suspended in the field of a superconducting coil achieving 3 nGal resolution after one month integration or 1 nGal over one year.

For horizontal fields, the first precision measurement of G was performed by Cavendish in 1798 who found G to one part per hundred. Since then, many additional experiments for determining G have been performed. Precision gravimetry extends beyond looking at gravitational fluctuations in the Earth. Experiments ranging from measurements of the gravitational constant G to imaging the contents of a container are currently an active field of exploration. For horizontal fields, many experiments have been performed using torsion pendula, simple pendula, and atom interferometry. While various gravimeters have been proposed, still further improvements may be desired. For example, it may be desirable to provide a small, lightweight, simple to build, easily portable, and/or inexpensive gravimeter capable of measuring gravitational fields or density fluctuations that are transverse to Earth's gravitational field. Additionally, it may be preferable to avoid the need for vacuum, cryostat, and/or cold atom technology.

SUMMARY OF THE INVENTION

In some embodiments, a gravimeter may be provided. The gravimeter may include a pendulum and an interferometer. The interferometer may include a light source, a beam splitter, a beam combiner, and a detector. The light source may be configured to project light along a beam path. A beam splitter may be disposed along the beam path and configured to split light from the light source along a first path and a second path. Light directed along the first path may be configured to reflect off the pendulum at a first position. Light directed along the second path may be configured to reflect off the pendulum at a second position different than the first position. A beam combiner may be provided that is configured to combine light direct along the first path and reflected off the pendulum at the first position with light directed along the second path and reflected off the pendulum at the second position. A detector may be provided and configured to receive the light combined by the beam splitter.

Optionally, the interferometer may be a Sagnac interferometer. In some embodiments, the interferometer may be a displaced Sagnac interferometer and preferably a displaced, even parity, Sagnac interferometer in some instances. Other types of interferometers may be used as well, such as a Michelson or Mach-Zehnder interferometer.

In some embodiments, the beam splitter and beam combiner are an integral component (e.g., a beam splitter/combiner). In other embodiments, the beam splitter and beam combiner may be separate components, which may be the case in a Michelson or Mach-Zehnder interferometer.

In some embodiments, the pendulum is magnetically damped, and critically damped in some instances. In some embodiments, a damping time may be less than 150 ms. The critical damping time may be set by the length and design of the pendulum. In some embodiments, a shorter pendulum may be used in the device to decrease the damping time. Since the damping time goes as the square root of the inverse length, the pendulum must be 4 times shorter to reduce the damping time by a factor of 2. Some designs may be constructed with critical damping times ranging from 10's of milliseconds to seconds.

Optionally, the interferometer is tuned with a single dark fringe of a bimodal interference pattern. Other techniques for determining the angle of deflection of the mirror are possible. For example, a laser beam may be reflected from the mirror and the amount of deflection may be observed after passing the beam through a lens and looking at split detector. Another technique may be provided which uses weak values angle amplification.

The gravimeter may be configured to measure gravitational fields transverse to Earth's gravitational field, and in some embodiments, to measure relative gravitational fields transverse to Earth's gravitational field. In some instances, the gravimeter may be configured to measure gravitational fields perpendicular to Earth's gravitational field.

The gravimeter may have a sensitivity of at least 100 fm/s$^2$–500 pm/s$^2$ after one second of integration. In many instances, the gravimeter does not use a vacuum and may not use a cryostat.

Changes in pendulum tilt may induce changes in an interference pattern of the light combined by the beam splitter. In some embodiments, the pendulum may be constrained to oscillate only in a single plane.

A reflector may be provided to couple with the pendulum. The reflector may be configured to reflect the light directed along the first path toward the pendulum and reflect the light directed along the second path toward the pendulum.

In some embodiments, the gravimeter may further include a signal processor coupled with the detector. The signal processor may be configured to calculate a tilt of the pendulum based on an interference pattern of the light combined by the beam combiner and may also output an output associated with the calculated tilt of the pendulum to a user.

In further aspects, a method may be provided. The method may include directing light toward a beam splitter and splitting the light with the beam splitter by directing a first portion of light along a first path and a second portion of light along a second path. The first portion of light directed along the first path may be configured to reflect off a pendulum at a first position. The second portion of light directed along the second path may be configured to reflect off the pendulum at a second position different than the first position. The method may further include combining, with a beam combiner, the first portion of light reflected off the pendulum at the first position with the second portion of light reflected off the pendulum at the second position. The combined light may then be received at a detector.

The method may further include analyzing an interference pattern of the combined light to determine a tilt of the pendulum. Additionally, an output associated with the tilt of the pendulum may be outputted to a user. The output may be associated with a gravitational field that is transverse to Earth's gravitational field, and may be a relative gravitational field that is transverse to Earth's gravitational field. Optionally, the output may be associated with a relative gravitational field that is perpendicular to Earth's gravitational field.

In some embodiments, the output may be associated with a target object mass and/or target object distance that produces the gravitational field that is transverse to Earth's gravitational field. The method may be performed under atmospheric pressure and/or at ambient temperatures. In some embodiments, the method may be performed without a cryostat.

The method may further include damping the pendulum (e.g., via magnetically damping). The pendulum may be critically damped. Optionally, a 1/e damping time of the pendulum may be less than 150 ms.

In further embodiments, a gravimeter may be provided that includes a pendulum and an interferometer configured to measure a change in a tilt of the pendulum in response to a gravitational field transverse to Earth's gravitational field that is associated with a presence of a target object having a mass.

The interferometer may include a light source configured to project light along a beam path and a beam splitter disposed along the beam path configured to split light from the light source along a first path and a second path. Light directed along the first path may be configured to reflect off the pendulum at a first position and light directed along the second path may be configured to reflect off the pendulum at a second position different than the first position. A beam combiner (which may be integral with the beam splitter) may be provided and configured to combine light direct along the first path and reflected off the pendulum at the first position with light directed along the second path and reflected off the pendulum at the second position. A detector may be provided that is configured to receive the light combined by the beam combiner.

The interferometer may be a Sagnac interferometer, particularly a displaced Sagnac interferometer in some embodiments. In some instances, the interferometer may be a displaced, even parity, Sagnac interferometer.

Optionally, the pendulum may be magnetically damped. The pendulum may be critically damped, for example. A damping time of the pendulum may be less than 150 ms.

In some embodiments, the interferometer may be tuned with a single dark fringe of a bimodal interference pattern.

In still further embodiments, a method may be provided including measuring, using an interferometer, a change in a tilt of a pendulum in response to a gravitational field transverse to Earth's gravitational field that is associated with a presence of a target object having a mass and outputting an output associated with the measured change in tilt of the pendulum. The interferometer may include a light source configured to project light along a beam path. A beam splitter may be included and may be disposed along the beam path and configured to split light from the light source along a first path and a second path. Light directed along the first path may be configured to reflect off the pendulum at a first position. Light directed along the second path may be configured to reflect off the pendulum at a second position different than the first position. A beam combiner may be included that is configured to combine light direct along the first path and reflected off the pendulum at the first position with light directed along the second path and reflected off the pendulum at the second position. A detector may be configured to receive the light combined by the beam combiner.

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

The invention will be better understood upon reading the following description and examining the figures which accompany it. These figures are provided by way of illustration only and are in no way limiting on the invention.

BRIEF DESCRIPTION OF THE DRAWINGS

Further details, aspects and embodiments of the invention will be described by way of example only and with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE INVENTION

The subject matter of embodiments of the present invention is described here with specificity, but the claimed subject matter may be embodied in other ways, may include different elements or steps, and may be used in conjunction with other existing or future technologies.

Embodiments of the present invention may be generally related to methods, devices, and systems which may be used to measure the dynamic gravitational field perpendicular to the Earth's gravitational field. In some embodiments, shot noise limited measurements with 1 mW of laser power may predict precision of the order of 10 pGal/Hz$^{-1/2}$.

Figure 1:
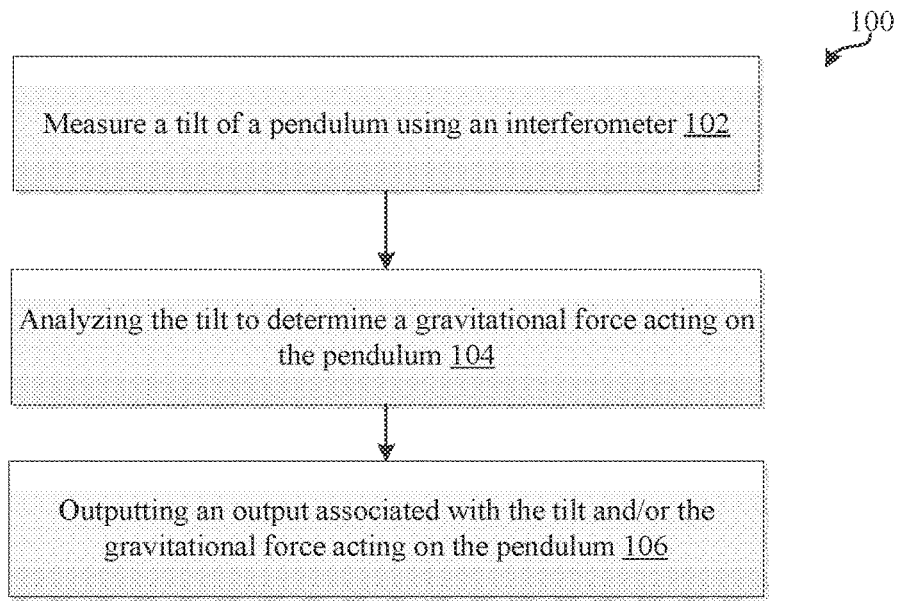
FIG. 1 illustrates an exemplary method according to some embodiments of the invention.

FIG. 1 illustrates an exemplary method 100 of measuring a gravitational force according to some embodiments of the present invention. At 102, a tilt of a pendulum is measured using an interferometer. At 104, the tilt of the pendulum is analyzed to determine a gravitational force acting on the pendulum. At 106, an output associated with the tilt and/or the gravitation force acting on the pendulum may be outputted.

Figure 2:
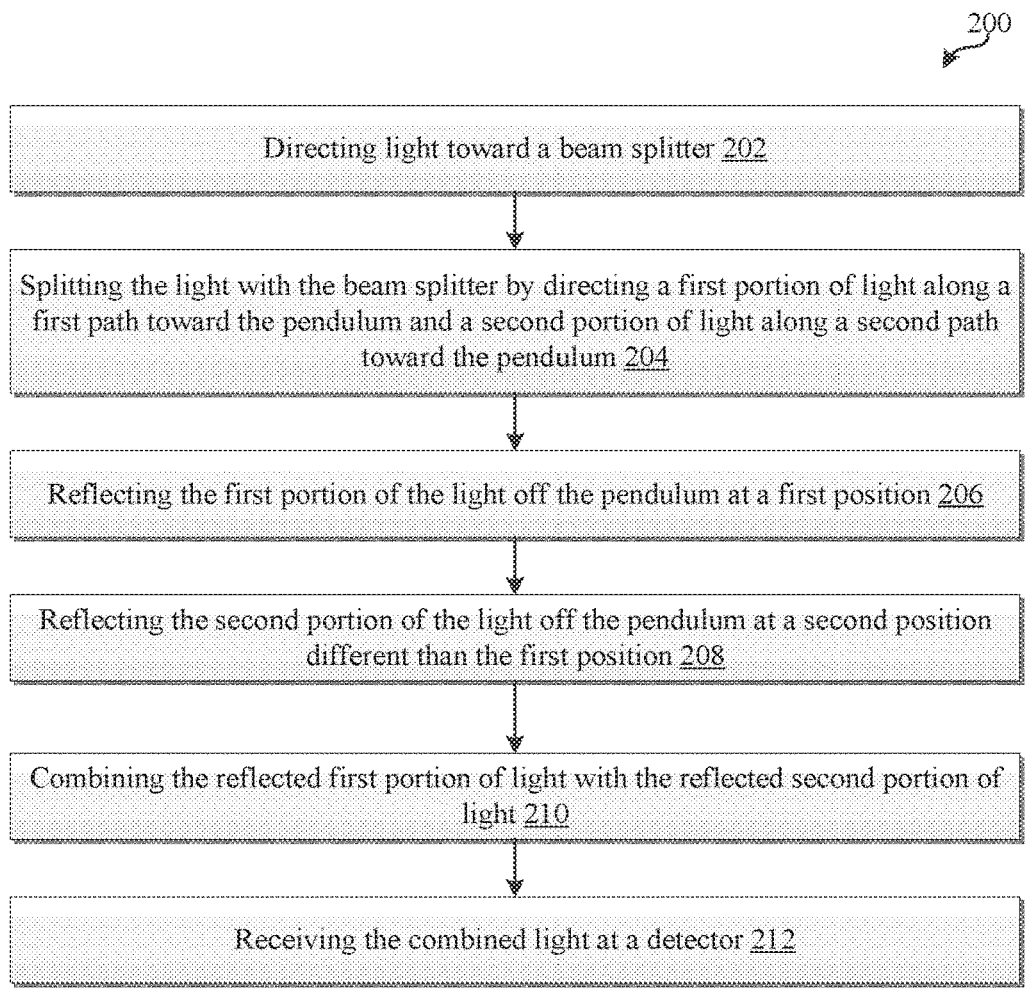
FIG. 2 illustrates an exemplary method according to some embodiments of the invention.

The tilt of a pendulum may be measured 102 using various types of interferometers. In many embodiments, a Sagnac interferometer may be provided and may provide better self-stability. Other embodiments may however utilize other interferometers such as a Mach-Zehnder or Michelson interferometer to acquire measure the relative phase signals. FIG. 2 illustrates an exemplary method 200 for measuring a tilt of a pendulum using an interferometer. At 202, light is directed toward a beam splitter. Thereafter, the light is split by the beam splitter 204 where a first portion of light is directed along a first path toward the pendulum and a second portion of light is directed along a second path toward the pendulum. The first portion of light may reflect off the pendulum at a first position 206. The second portion of the light may reflect off the pendulum at a second position 208. Thereafter, the reflected first portion of light may be combined 210 with the reflected second portion of light. The combined light may then be received 212 at a detector.

Figure 3:
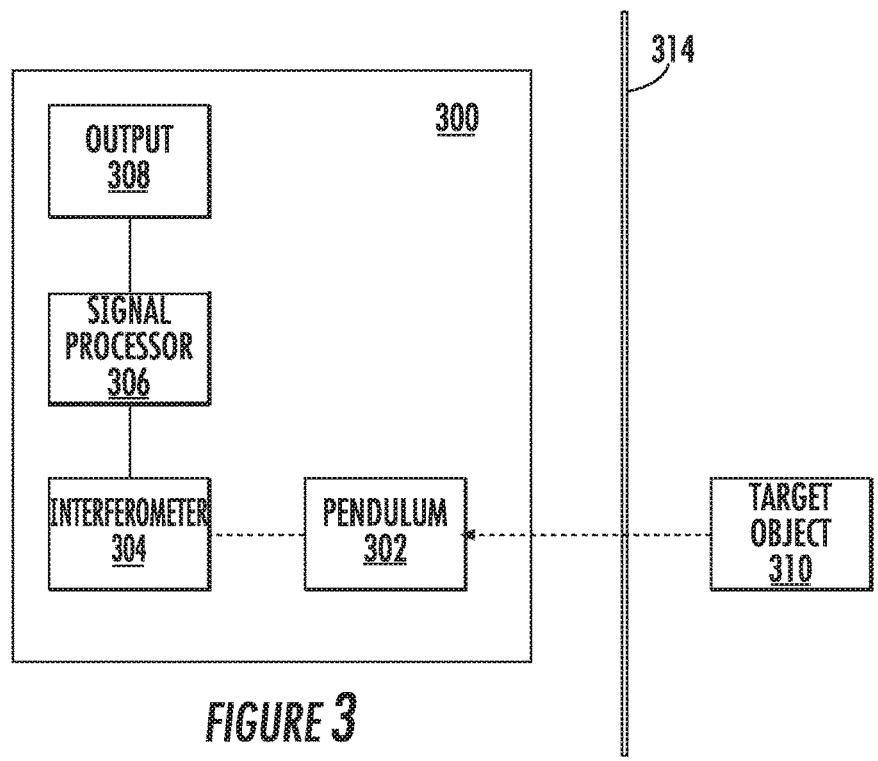
FIG. 3 illustrates an exemplary gravimeter according to some embodiments of the invention.

FIG. 3 illustrates an exemplary gravimeter 300 according to some embodiments of the invention. The gravimeter 300 may be configured to perform methods 100 and 200 described above. Gravimeter 300 may include a pendulum 302. A interferometer 304 may be provided to measure a tilt of pendulum 302. The interferometer 304 may be coupled with a signal processor 306. Signal processor 306 may receive signals from interferometer 304 and may be configured to process the received signals to provide output to a user via output 308.

Gravimeter 300 may be configured to measure a gravitational field. The gravitational field being measured may be transverse to Earth's gravitational field in some embodiments. Optionally, the gravitational field being measured may be perpendicular to Earth's gravitational field. In some embodiments, the gravimeter 300 may be configured to measure a dynamic gravitational field. For example, in relative gravimeter embodiments, the pendulum 302 may be in equilibrium with the surround mass distribution and the introduction of another mass may change the equilibrium position of the pendulum 302. As will be described further below, some embodiments may utilize a critically damped pendulum 302 so as to limit pendulum 302 response time. Thereafter, the tilt of the pendulum 302 as measured by the interferometer 304, may be associated with the introduced gravitational field. Accordingly, the measured gravitational field may be associated with a target object 310. The target object 310 may have a mass and may be spaced a distance from the pendulum 302 of gravimeter 300. As the target object 310 is moved relative to gravimeter 300, a tilt of the pendulum 302 may change. The change in pendulum tilt may be detected using interferometer 304, measured using signal processor 306, and outputted via output 308. Output 308 may be an audio or visual output. For example, in some embodiments, the output 308 may comprise a speaker and/or a display for outputting data to the user. The output 308 may output an interference pattern to the user. Optionally, the output 308 may output a measured gravitational field that is transverse (e.g., perpendicular) to Earth's gravitational field. The output 308 may also output a calculated target object mass or distance to the gravimeter 300.

In many embodiments, the gravitational field associated with a target object 310 may be detected with gravimeter 300 even if the target object 310 is positioned behind a wall 314 or other opaque objects and surfaces relative to the gravimeter 300. Accordingly, in some embodiments, the gravimeter 300 may be utilized to measure gravitational fields associated with target objects 310 without a direct line of sight. For example, the gravimeter 300 may be utilized to investigate the internal contents of a container without the need for opening the container. In some embodiments, the target object 310 may be a human person and the gravimeter 300 may be sensitive enough to detect the person and the person's movement from a distance and through opaque barriers. Alternatively, gravimeter 300 may be configured to measure density fluctuations throughout an object (including a human body), by positioning one or more gravimeters 300 relative to the object and taking measurements from a number of positions and/or orientations.

In some embodiments, the pendulum 302 may be configured to oscillate only in a single plane. The pendulum 302 may have a mass m and a length L. The pendulum 302 may be acted upon by Earth's gravity and by the force of a distance remote object of mass M, which induces a force F that is transverse (or substantially perpendicular) to Earth's gravity on the test mass of the pendulum 302. In the presence of the remote object, the pendulum may be at an angle θ with respect to the vertical. The equilibrium condition is then:

$$F \cos \theta = mg \sin \theta. \quad (1)$$

Using small angle approximation, equation (1) may be simplified to:

$$F = mg\theta. \quad (2)$$

In some embodiments, rather than measure the angular displacement of the mass, the distance which the mass has shifted Lθ may be measured.

The distance the pendulum 302 moves under the influence of a transverse force may be measured using interference techniques. By interfering light (e.g., lasers) from the pendulum 302 with a local oscillator, the new relative phase shift can be measured. For normal reflection from the bottom tip of the moving portion of the pendulum 302, the relative phase may be given by:

$$\phi = 2kL\theta \quad (3)$$

where k is the wavenumber. The following force equation may then be obtained:

$$F = \frac{mg\phi}{2kL}. \quad (4)$$

For shot noise limited measurements, the following approximation can be made:

$$\Delta\phi = \frac{1}{2\sqrt{N}}, \quad (5)$$

where N is the number of photons measured. For relatively modest parameters, gravimeter 300 may measure very sensitive gravity fluctuations due to moving objects.

To demonstrate, acceleration sensitivity was calculated. The force equation (4) was divided by the test mass. Using visible light photons (k≈$10^7$ m$^{-1}$), approximately $10^{16}$ photons/second flux (approximately 1 mW of cW laser power) in the interferometer, a pendulum length of 2 cm, an interferometric sensitive of the order of $10^{-13}$ m/s$^2$ or 1 pGal can be obtained after one second of integration.

Accordingly, this gravimeter 300 may be used to measure modest masses at relatively large distances. The force F may be the gravitational force due to a mass M at a distance d. Solving for d, the following equation is obtained:

$$d = \sqrt{\frac{4GkLM\sqrt{N}}{g}}. \quad (6)$$

Using the same numbers as above with a mass of M=1 kg, d≈25 m. In other words, the gravimeter 300 may be sensitive enough to measure a single kilogram mass up to 25 meters away with a shot-noise limited signal-to-noise ratio of 1 after one second of integration.

Achieving the shot noise limited sensitivity for gravimeters may be difficult owing to significant environmental noise that can couple into the gravimeter 300. In some embodiments, using a single laser to interact with the pendulum 302, high precision readout may utilize ultra-high phase stabilization of a local oscillator. Optionally, ideas in weak values may be used where technical noise can be suppressed, in some cases, by several orders of magnitude and phase stabilization can be made to a high degree of precision. For example, an interferometer may be operated in the inverse weak value domain. For the inverse weak value, $k_t\sigma=1$, where $k_t$ is the transverse momentum shift and σ is the beam width. The operation of the interferometer in this configuration may result in an average beam displacement given by $\phi/k_t$, which can make the displacement a very sensitive function of phase for small $k_t$. However, this large shift may not change the ultimate sensitivity, because it reduces the signal strength at the detector by $(k_t\sigma \cos(\phi/2))^2$.

Figure 4:
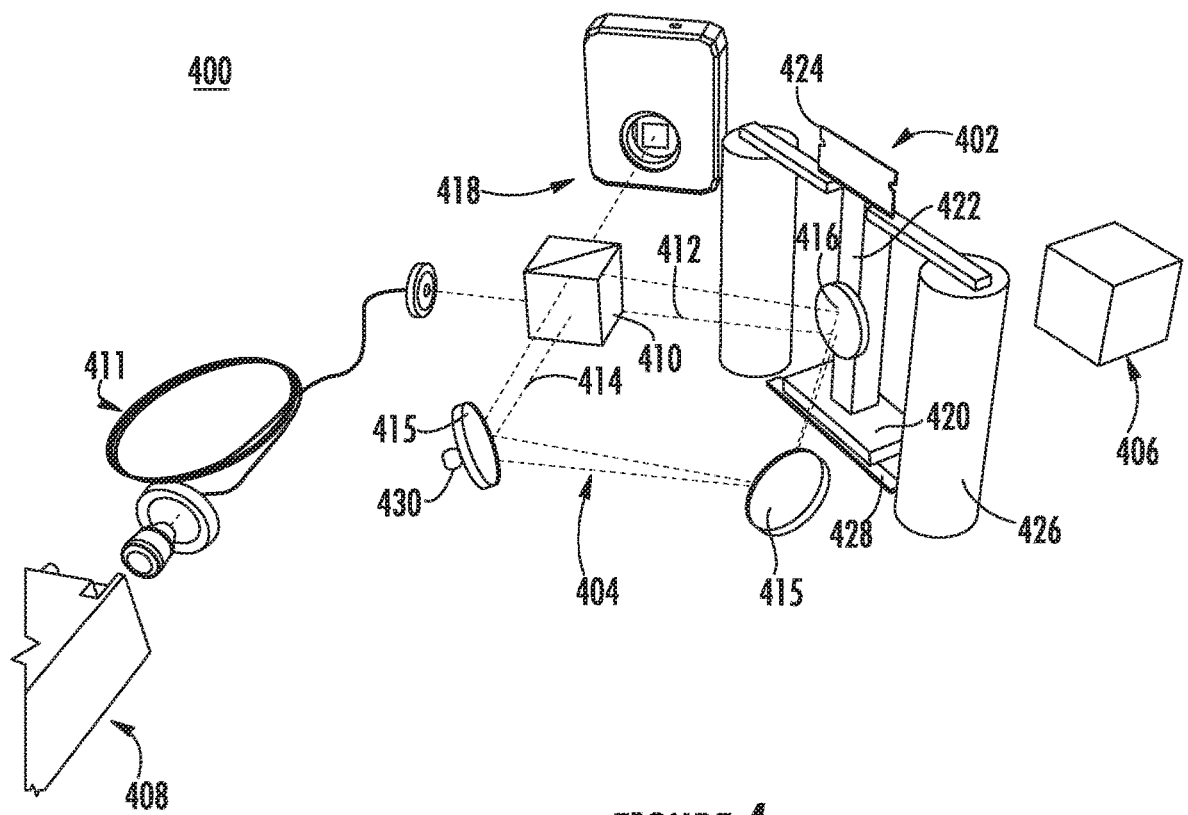
FIG. 4 illustrates an exemplary system according to some embodiments of the invention.

FIG. 4 illustrates an exemplary arrangement 400 for a gravimeter to further explain concepts utilized in some embodiments of the present invention. The arrangement 400 includes a pendulum 402 and an interferometer 404 configured to measure a tilt of the pendulum 402. The tilt of the pendulum 402 may be associated with a gravitational force of test mass 406.

As illustrated, light from a fiber-coupled laser 408 may be directed toward a 50/50 beam splitter 410 of the interferometer 404. In some embodiments, a fiber coupler and launcher 411 may direct the light from the laser 408 toward the beam splitter 410. The beam splitter 410 may split the received light such that a first portion of light travels along a clockwise beam path 412 and a second portion of light travels along a counterclockwise beam path 414. The first portion of light directed along the clockwise beam path 412 may then proceed to strike the pendulum 402 and then mirrors 415. The second portion of light directed along the counterclockwise beam path 414 may then proceed to strike mirrors 415 prior to striking the pendulum 402. The clockwise and counterclockwise beam paths 412, 414 may strike different positions of the pendulum 402. In some embodiments, the first portion and second portion of light strike different heights along pendulum 402. Optionally, the clockwise and counterclockwise beam paths 412, 414 may strike a deflector (e.g., mirror) 416 coupled with the pendulum 402. After the first portion of light strikes the pendulum 402 and the mirrors 415, the first portion of light may be combined with the second portion of light after the second portion of light strikes the mirrors 415 and the pendulum 402 using beam splitter 410. The beam splitter 410 may then direct the combined light toward a detector 418 (e.g., a quad-cell detector or the like). A tilt in the pendulum 402 may induce a relative phase between the two paths 412, 414. The phase causes a shift of an interference fringe at the output of the interferometer 404 which is detectable by detector 418.

In some embodiments, the pendulum 402 may be a rigid pendulum that includes a block 420 coupled at a distal free end of an elongate rod 422. In some embodiments, the pendulum 402 may be configured to oscillate only in a single plane. For example, a proximal end of rod 422 may be coupled with a blade 424. The blade 424 may engage supports 426 with a height sufficient to suspend the block 420.

The block 420 may be a rectangular block, although other configurations are possible (e.g., cylindrical rod, triangular block, etc.). The block 420 may be made from copper or other materials. The block 420 may have a mass of 180 g in some embodiments. The block 420 may have a length of less than 7 cm and a thickness of 0.9 cm. Rod 420 may be an aluminum rode and blade 424 may be a razor blade. In the exemplary arrangement 400, the table may be grounded and the block 420 may be electrically connected through the metal pendulum 402. While particular dimensions, properties, and materials are recited, it should be understood that these dimensions, properties, and materials are not critical and non-limiting. Rather, the dimensions, properties, and materials are provided for illustrative purposes only.

Additionally, in some embodiments, the pendulum 402 may be damped by a damper 428. For example, a magnet 428 may be placed below the block 420. The magnet 428 may dampen the vibrations from Eddy currents or the like. In some embodiments, magnet 428 may be an elongate neodymium magnet. The magnet 428 may extend parallel to an axis of rotation of the pendulum 402. In some embodiments, the magnet 428 may urge the pendulum 402 to vertical. In some embodiments, the height of the block 420 relative to the magnet 428 may be tuned until critical damping is achieved (e.g., by adjusting heights of supports 426). The 1/e damping time may be approximately 100 ms.

In the illustrated exemplary arrangement 400, the laser 408 may be a 2.5 mW fiber-coupled, free-running, diode laser, available from Thorlabs. Any collimated light source may be used however. The fiber-coupled laser may provide an approximately Gaussian shape to the beam. The light directed at the beam splitter 410 may be tilted upward, so that the exit beam from the interferometer 404 is significantly higher than the input beam. In other embodiemnts, the beam may be deflected downward. In some embodiments mirrors 415 may be 2 cm in diameter. Further, in some embodiments, at least one of the mirrors 415 may be coupled with an actuator 430 to provide beam alignment and tuning control. The actuator 430 may be a multi-axis piezo-actuator in some embodiments.

In some embodiments, the interferometer 404 may be configured such that the clockwise beam path 412 strikes the pendulum 402 about 0.1-2 cm below a position where the counterclockwise beam path 414 strikes the pendulum 402. In some embodiments, the clockwise beam path 412 strikes the pendulum 402 at least 2 cm below a position where the counterclockwise beam path 414 strikes the pendulum 402. The greater separation between the beams on the pendulum, the greater the sensitivity of the device. The pendulum 402 may have a reflective surface for reflecting incident light or in the alternative a mirror 416 may be coupled with the pendulum 402 (e.g., via epoxy or the like) for reflecting incident rays of light.

In some embodiments, a Sagnac interferometer 404 may be used. The Sagnac interferometer 404 may a displaced Sagnac interferometer 404. Optionally, the Sagnac interferometer 404 is an even parity interferometer. In some embodiments, the displaced Sagnac interferometer 404 allows the beams to sample two different positions (e.g., heights) of the pendulum 402 while still achieving Sagnac stability and to use low coherence sources. The parity of the interferometer 404 may be determined by the number of mirrors, in addition to the beam splitter 410, inside the interferometer 404. For an even number of mirrors, the deflection of the beams may have the same tilt, relative to the optical axis, at the exit port of the beam splitter. For an odd number of mirrors, the beams may have tilts that move in the opposite direction relative to the optical axis. Thus, an even parity design may allow for relatively straight forward rough alignment of the interferometer 404. The Sagnac configuration may also cancel translational vibration noise since both the upper and lower beams may be translated in the same way which may preserve phase stability. Further, noise sources outside the interferometer such as beam jitter or detector jitter are not amplified. In some embodiments, Michelson interferometer techniques may be used, but Sagnac interferometer techniques may provide improved stability by several orders of magnitude.

To readout pendulum shifts, the interferometer 404 may be tuned (e.g., using actuator 430) to be close to the dark port until a bimodal interference pattern with a large dark fringe results. One axis of the actuator 430 may then be used to place the dark fringe in the middle of the intensity pattern. The lobes of the bimodal intensity pattern may be aligned to two halves of a quad detector 418 so that their difference signal can be measured. The rapidly moving fringe may then result in large changes in the amount of light striking each side of the quad detector 418.

In some embodiments, repeatability of detector alignment may be difficult. Accordingly, rather than fully calibrating kt and σ, the system may be roughly aligned to a good regime by tuning to the near-perfect dark port. Then, the interferometer may be adjusted coarsely by adjusting the piezo-actuated mount until the first vertical dark fringe occurs. Thereafter, the sensitivity of the device may be calibrated with a known mass at a given distance while monitoring the signal voltage. This may allow for calibration of the signal response for the given test mass for that alignment. While the ultimate sensitivity of the inverse weak value and the standard homodyne technique may result in the same shot noise limit, the inverse weak value is useful, because the small phase shifts that result from the very small pendulum tilts can lead to large dark fringe shifts, which are easily readout from the detector.

The sensitivity of the device makes it ideal for many fundamental studies and practical applications. For example, one can use the pendulum for making an optical mass standard. Owing to the fluctuations in the mass standard due to corrosion, other techniques are being sought to define the kilogram. A beam of well-defined power can induce an optical force that can be used as a mass calibration. Another example is to explore some of the ideas associated with gravity and quantum mechanics, such as the destruction of a superposition because of gravitational self-attraction.

Owing to the simplicity of the system, it is easy to imagine arrays of these sensors. With four such devices, a three dimensional determination of the position and mass of the object can be determined assuming a large enough signal to noise ratio. For example, four detectors arranged on the four corners of a square could be used to obtain the three-dimensional location of a mass and its mass. With a knowledge of the velocity of an object (velocity can be determined from temporal responses of the pendula), additional structure information can be gathered. Further, with a large array of sensors allowed to pivot about their tilt-axis or translated, even static environments can be gravitationally imaged. Accordingly in some embodiments, embodiments of a gravimeter may be coupled with one or more linear or rotational actuators or may be translated along guide rails or the like.

Additionally, the sensitivity of this device may be sufficient to gravitationally map density variations within the body. As a simple proof-of-principle simulation, a uniform smaller sphere of known density, but unknown size and position inside a larger sphere of known radius and uniform density was considered. For simplicity, the position was estimated along a single axis. With two unknowns, size and single-axis position, only two gravity measurements were needed. Two gravity detectors separated by a distance of one meter with the same z=0 cm, y=0 cm coordinate were used. It was assumed that the center of each sphere had a z=30 cm and y=0 m, but unknown x for the smaller sphere, albeit within the larger sphere. For the simulation, the density of the larger sphere was assumed $\rho_L$=1000 kg/m$^3$ (the density of water) and only a slightly higher density $\rho_S$=1100 kg/m$^3$ for the smaller sphere. The radius of the larger sphere is 10 cm and the center of the large sphere was half way between the two detectors. A precision of 10 pGal and using a smaller sphere radius of 3 cm was assumed. Solving the inverse problem, it was found that the simulation predicted the position of the smaller sphere to within 0.5 cm along the x-axis and determined the mass to within 1%. The density problem is easier in Airport scanners where hidden objects typically have much higher density contrasts. It should also be understood that even static environments can be imaged if the detectors are allowed to move.

In conclusion, a simple pendulum gravimeter is disclosed where the tilt is measured using a displaced Sagnac interferometer in the inverse weak value regime. The inverse weak value amplifies the dark fringe movement for a given phase shift. The Sagnac setup is robust to noise and allows for high precision measurements of moving masses. Both $1/r^2$ behavior as well as the linearity in the test mass was also demonstrated. Additionally, measurements with a sensitivity of 10 pm/s$^2$ or 1 nGal were conducted within a few seconds and a shot noise limited resolution of 100 fm/s$^2$/Hz$^{-1/2}$ or 10 pGal/Hz$^{-1/2}$ is predicted. Embodiments of the detector may be used in opaque remote sensing environments, medical imaging or in airport scanners. With the use of angle amplifiers and/or increasing the distance between the beams on the mirrors it may be possible to increase the sensitivity of the device by 10 to 100 times over the demonstrated system.

One or more computing devices may be adapted to provide desired functionality by accessing software instructions rendered in a computer-readable form. When software is used, any suitable programming, scripting, or other type of language or combinations of languages may be used to implement the teachings contained herein. However, software need not be used exclusively, or at all. For example, some embodiments of the methods and systems set forth herein may also be implemented by hard-wired logic or other circuitry, including but not limited to application-specific circuits. Combinations of computer-executed software and hard-wired logic or other circuitry may be suitable as well.

Embodiments of the methods disclosed herein may be executed by one or more suitable computing devices. Such system(s) may comprise one or more computing devices adapted to perform one or more embodiments of the methods disclosed herein. As noted above, such devices may access one or more computer-readable media that embody computer-readable instructions which, when executed by at least one computer, cause the at least one computer to implement one or more embodiments of the methods of the present subject matter. Additionally or alternatively, the computing device(s) may comprise circuitry that renders the device(s) operative to implement one or more of the methods of the present subject matter.

Any suitable computer-readable medium or media may be used to implement or practice the presently-disclosed subject matter, including but not limited to, diskettes, drives, and other magnetic-based storage media, optical storage media, including disks (e.g., CD-ROMS, DVD-ROMS, variants thereof, etc.), flash, RAM, ROM, and other memory devices, and the like.

The subject matter of embodiments of the present invention is described here with specificity, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

This description should not be interpreted as implying any particular order or arrangement among or between various steps or elements except when the order of individual steps or arrangement of elements is explicitly described. Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

Reference List, each of which is incorporated herein by reference:

[1] D. J. Starling, P. B. Dixon, N. S. Williams, A. N. Jordan, and J. C. Howell, Continuous phase amplification with a Sagnac interferometer. Phys. Rev. A 82, 011802(R) (2010).

[2] J. Wahr, S. Swenson, V. Zlotnicki, and I. Velicogna. Time-variable gravity from GRACE: first results. Geophys. Res. Lett. 31, L11501 (2004).

[3] ESA Gravity Mission GOCE.

[4] Bingham, R J et al. (2010). "Using GOCE to estimate the mean North Atlantic circulation (Invited)". Abstract presented at 2010 Fall Meeting, AGU, San Francisco, Calif., 13-17 December. American Geophysical Union. Retrieved 22 Dec. 2010.

[5] R. E. Bell and R. O. Hansen. The rise and fall of early oil field technology: The torsion balance gradiometer. The Leading edge, 17, 81 (1998).

[6] Edwin H. van Leeuwen. BHP develops airborne gravity gradiometer for mineral exploration. The Leading Edge 19(12), 1296 (2000).

[7] P. Diorio. Examples of the application of airborne gravity gradiometry to natural resource exploration. Geophysical Research Abstracts 5 03996 (2003).

[8] A. J. Romaides et al A comparison of gravimetric techniques for measuring subsurface void signals. Journal of Physics D Applied Physics 34, 433 (2001).

[9] "Micro-g LaCoste Absolute Gravimeters". Micro-g LaCoste, Inc. 2012.

[10] A Peters et al High-precision gravity measurements using atom interferometry. Metrologia 38 25 (2001).

[11] J. M. Goodkind, The superconducting gravimeter Rev. Sci. Instrum. 70, 4131 (1999).

[12] H. Cavendish Experiments to determine the density of the earth, Phil. Trans R. Soc. Lond 88, 469 (1798).

[13] G. G. Luther and W. R Towler, Phys. Rev. Lett. 48, 121 (1982).

[14] K. Kuroda, Phys. Rev. Lett. 75, 2796 (1995).

[15] O. V. Karagioz and V. P. Izmailov, Meas. Tech. 39, 979 (1996).

[16] C. H. Bagley and G. G. Luther, Phys. Rev. Lett. 78, 3047 (1997).

[17] J. H. Gundlach and S. M. Merkowitz, Phys. Rev. Lett. 85, 2869 (2000).

[18] T. J. Quinn, C. C. Speake, S. J. Richman, R. S. Davis, and A. Picard, Phys. Rev. Lett. 87, 111101 (2001).

[19] T. R. Armstrong and M. P. Fitzgerald, Phys. Rev. Lett. 91, 201101 (2003).

[20] J. Luo et al, Phys. Rev. Lett. 102, 240801 (2009).

[21] U. Kleinevoss, H. Meyer, A. Schumacher, and S. Hartmann, Meas. Sci. Technol. 10, 492 (1999).

[22] H. V. Parks and J. E. Faller, Phys. Rev. Lett. 105, 110801 (2010).

[23] A. Peters, K. Y. Chung and S. Chu Measurement of gravitational acceleration by dropping atoms, Nature 400, 849 (1999).

[24] J. M. McGuirk, G. T. Foster, J. B. Fixler, M. J. Snadden and M. A. Kasevich Sensitive absoluate-gravity gradiometry using atom interferometry, Phys. Rev. A 65 033608 (2002).

[25] S. Dimoupoulos, P. Graham, J. Hogan, and M. Kasevich, Testing general relativity with atom interferometry, Phys. Rev. Lett. 98.

[26] M. deAngelis et al Precision Gravity with Atomic Sensors, Meas. Sci. Technol. 20, 022001 (2009).

[27] G. Lamporesi, A. Bertoldi, L Cacciapuoti, M. Prevedelli, and G. M. Tino Determination of the Newtonian gravitational constant using atom interferometry, Phys. Rev. Lett. 100, 050801 (2008).

[28] F. Sorrentino et al Sensitive gravity-gradiometry with atom interferometry: progress towards an improved determination of the gravitational constant. New J. Phys. 12 095009 (2010).

[29] G. Rosi, F. Sorrentino, L. Cacciapuoti, M. Prevedelli and G. M. Tino, Precision measurement of the Newtonian gravitational constant using cold atoms. Nature 510, 518 (2014).

[30] A. N. Jordan, J. Martinez-Rincn, J. C. Howell Technical Advantages for Weak-Value Amplifcation: When Less Is More Phys. Rev. X 4 011031 (2014).

[31] G. I. Viza, J. Martnez-Rincn, G. B. Alves, A. N. Jordan, J. C. Howell, Experimentally Quantifying the Advantages of Weak-Values-Based Metrology arXiv 1410.8461v2 (2014).

What is claimed is:

1. A gravimeter comprising:
a pendulum;
an interferometer comprising:
  a light source configured to project light along a beam path;
  a beam splitter disposed along the beam path and configured to split light from the light source along a first path and a second path, wherein light directed along the first path is configured to reflect off the pendulum at a first position, wherein light directed along the second path is configured to reflect off the pendulum at a second position different than the first position;
  a beam combiner configured to combine light direct along the first path and reflected off the pendulum at the first position with light directed along the second path and reflected off the pendulum at the second position; and
  a detector configured to receive the light combined by the beam splitter.

2. The gravimeter of claim 1, wherein the interferometer comprises a Sagnac interferometer.

3. The gravimeter of claim 2, wherein the interferometer comprises a displaced Sagnac interferometer.

4. The gravimeter of claim 3, wherein the interferometer comprises a displaced, even parity, Sagnac interferometer.

5. The gravimeter of claim 1, wherein the beam splitter and beam combiner are an integral component.

6. The gravimeter of claim 1, wherein the first position is a first height and the second position is a second height that is less than the first height.

7. The gravimeter of claim 1, wherein the pendulum is magnetically damped.

8. The gravimeter of claim 5, wherein the pendulum is critically damped.

9. The gravimeter of claim 8, wherein a damping time is less than 150 MS.

10. The gravimeter of claim 1, wherein the interferometer is tuned with a single dark fringe of a bimodal interference pattern.

11. The gravimeter of claim 1, wherein the gravimeter is configured to measure gravitational fields transverse to Earth's gravitational field.

12. The gravimeter of claim 11, wherein the gravimeter is configured to measure relative gravitational fields transverse to Earth's gravitational field.

13. The gravimeter of claim 11, wherein the gravimeter is configured to measure gravitational fields perpendicular to Earth's gravitational field.

14. The gravimeter of claim 11, wherein the gravimeter has a sensitivity of at least 500 pm/s$^2$ after one second of integration.

15. The gravimeter of claim 11, wherein the gravimeter does not use a vacuum.

16. The gravimeter of claim 11, wherein the gravimeter does not use a cryostat.

17. The gravimeter of claim 1, wherein changes in pendulum tilt induce changes in an interference pattern of the light combined by the beam combiner.

18. The gravimeter of claim 1, wherein the pendulum is constrained to oscillate only in a single plane.

19. The gravimeter of claim 1, further comprising a reflector coupled with the pendulum, the reflector configured to reflect the light directed along the first path toward the pendulum and reflect the light directed along the second path toward the pendulum.

20. The gravimeter of claim 1, further comprising a signal processor coupled with the detector, the signal processor configured to calculate a tilt of the pendulum based on an interference pattern of the light combined by the beam combiner and to output an output associated with the calculated tilt of the pendulum to a user.

21. A method comprising:
directing light toward a beam splitter;
splitting the light with the beam splitter by directing a first portion of light along a first path and a second portion of light along a second path, wherein the first portion of light directed along the first path is configured to reflect off a pendulum at a first position, wherein the second portion of light directed along the second path is configured to reflect off the pendulum at a second position different than the first position;
combining, with a beam combiner, the first portion of light reflected off the pendulum at the first position with the second portion of light reflected off the pendulum at the second position; and
receiving the combined light at a detector.

22. The method of claim 21, further comprising analyzing an interference pattern of the combined light to determine a tilt of the pendulum.

23. The method of claim 22, further comprising outputting an output associated with the tilt of the pendulum to a user.

24. The method of claim 23, wherein the output is associated with a gravitational field that is transverse to Earth's gravitational field.

25. The method of claim 24, wherein the output is associated with a relative gravitational field that is transverse to Earth's gravitational field.

26. The method of claim 25, wherein the output is associated with a relative gravitational field that is perpendicular to Earth's gravitational field.

27. The method of claim 24, wherein the output is associated with a target object mass and/or target object distance that produces the gravitational field that is transverse to Earth's gravitational field.

28. The method of claim 24, wherein the method is performed under atmospheric pressure.

29. The method of claim 24, wherein the method is performed at ambient temperatures.

30. The method of claim 24, wherein the method is performed without a cryostat.

31. The method of claim 21, further comprising damping the pendulum.

32. The method of claim 31, wherein damping the pendulum comprises magnetically damping the pendulum.

33. The method of claim 31, wherein damping the pendulum comprises critically damping the pendulum.

34. The method of claim 33, wherein a damping time of the pendulum is less than 150 ms.

35. A gravimeter comprising:
a pendulum;
an interferometer configured to measure a change in a tilt of the pendulum in response to a gravitational field transverse to Earth's gravitational field that is associated with a presence of a target object having a mass.

36. The gravimeter of claim 35, wherein the interferometer comprises:
  a light source configured to project light along a beam path;
  a beam splitter disposed along the beam path configured to split light from the light source along a first path and a second path, wherein light directed along the first path is configured to reflect off the pendulum at a first position, wherein light directed along the second path is configured to reflect off the pendulum at a second position different than the first position, and
  a beam combiner configured to combine light direct along the first path and reflected off the pendulum at the first position with light directed along the second path and reflected off the pendulum at the second position; and
  a detector configured to receive the light combined by the beam combiner.

37. The gravimeter of claim 36, wherein the interferometer comprises a Sagnac interferometer.

38. The gravimeter of claim 37, wherein the interferometer comprises a displaced Sagnac interferometer.

39. The gravimeter of claim 38, wherein the interferometer comprises a displaced, even parity, Sagnac interferometer.

40. The gravimeter of claim 36, wherein the pendulum is magnetically damped.

41. The gravimeter of claim 40, wherein the pendulum is critically damped.

42. The gravimeter of claim 41, wherein a damping time of the pendulum is less than 150 ms.

43. The gravimeter of claim 36, wherein the interferometer is tuned with a single dark fringe of a bimodal interference pattern.

44. A method comprising:
  measuring, using an interferometer, a change in a tilt of a pendulum in response to a gravitational field transverse to Earth's gravitational field that is associated with a presence of a target object having a mass;
  outputting an output associated with the measured change in tilt of the pendulum.

45. The method of claim 44, wherein the interferometer comprises:
  a light source configured to project light along a beam path;
  a beam splitter disposed along the beam path configured to split light from the light source along a first path and a second path, wherein light directed along the first path is configured to reflect off the pendulum at a first position, wherein light directed along the second path is configured to reflect off the pendulum at a second position different than the first position;
  a beam combiner configured to combine light direct along the first path and reflected off the pendulum at the first position with light directed along the second path and reflected off the pendulum at the second position; and
  a detector configured to receive the light combined by the beam combiner.

46. The method of claim 45, wherein the interferometer comprises a Sagnac interferometer.

47. The method of claim 46, wherein the interferometer comprises a displaced Sagnac interferometer.

48. The method of claim 47, wherein the interferometer comprises a displaced, even parity, Sagnac interferometer.

49. The method of claim 45, wherein the pendulum is magnetically damped.

50. The method of claim 49, wherein the pendulum is critically damped.

51. The method of claim 50, wherein a damping time of the pendulum is less than 150 ms.

52. The method of claim 45, wherein the interferometer is tuned with a single dark fringe of a bimodal interference pattern.

* * * * *